(12) United States Patent
Palmer

(10) Patent No.: US 12,195,322 B2
(45) Date of Patent: Jan. 14, 2025

(54) APPARATUS FOR THE TRANSFER AND DISTRIBUTION OF BULK LIQUIDS

(71) Applicant: Parrish Enterprises, Ltd., Enid, OK (US)

(72) Inventor: David Palmer, Enid, OK (US)

(73) Assignee: Parrish Enterprises, Ltd., Enid, OK (US)

( * ) Notice: Subject to any disclaimer, the term of this patent is extended or adjusted under 35 U.S.C. 154(b) by 479 days.

(21) Appl. No.: 17/712,957

(22) Filed: Apr. 4, 2022

(65) Prior Publication Data

US 2023/0312331 A1  Oct. 5, 2023

(51) Int. Cl.
| | |
|---|---|
| *B67D 7/62* | (2010.01) |
| *B01D 29/11* | (2006.01) |
| *B01D 35/15* | (2006.01) |
| *B01D 35/157* | (2006.01) |
| *B01D 35/26* | (2006.01) |
| *B01D 35/30* | (2006.01) |
| *B67D 7/36* | (2010.01) |
| *B67D 7/76* | (2010.01) |

(52) U.S. Cl.
CPC ............... *B67D 7/62* (2013.01); *B01D 29/11* (2013.01); *B01D 35/15* (2013.01); *B01D 35/1573* (2013.01); *B01D 35/26* (2013.01); *B01D 35/30* (2013.01); *B67D 7/36* (2013.01); *B67D 7/76* (2013.01); *B67D 2210/0001* (2013.01)

(58) Field of Classification Search
CPC ........ B01D 29/11; B01D 29/31; B01D 35/15; B01D 35/1573; B01D 35/26; B01D 35/30; B67D 2210/0001; B67D 7/04; B67D 7/36; B67D 7/62; B67D 7/66; B67D 7/76
See application file for complete search history.

(56) References Cited

U.S. PATENT DOCUMENTS

| | | | | |
|---|---|---|---|---|
| 3,905,516 | A  * | 9/1975 | Wisnia ................ | F04D 15/0066 417/43 |
| 6,945,288 | B1 * | 9/2005 | Brakefield ............... | B67D 7/58 141/231 |
| 7,681,607 | B2 * | 3/2010 | Palmer ................ | F04D 15/0005 141/286 |
| 8,109,300 | B2 * | 2/2012 | Brakefield ............... | B67D 7/04 141/231 |
| 2013/0025694 | A1 * | 1/2013 | Lynn ........................ | B67D 7/62 137/1 |

* cited by examiner

*Primary Examiner* — Dirk R Bass
(74) *Attorney, Agent, or Firm* — Dunlap Codding, P.C.

(57) ABSTRACT

An apparatus for transferring a liquid includes a conduit, a strainer housing, and a flow control reversing valve. The conduit has an inlet, an outlet, and a centerline extending from a first end to a second end. The strainer housing houses a strainer basket and has an inlet, an outlet, and a centerline extending from a first end to a second end. The flow control reversing valve has a valve body and a valve member. The valve body has a centerline extending from a front side to a rear side. The valve member is movable between a first position wherein liquid flows from a first port to a second port, and a second position wherein liquid flows from the second port to the first port. Each of the longitudinal centerlines of the conduit, the strainer housing, and the flow control reversing valve is substantially vertically aligned with one another.

20 Claims, 10 Drawing Sheets

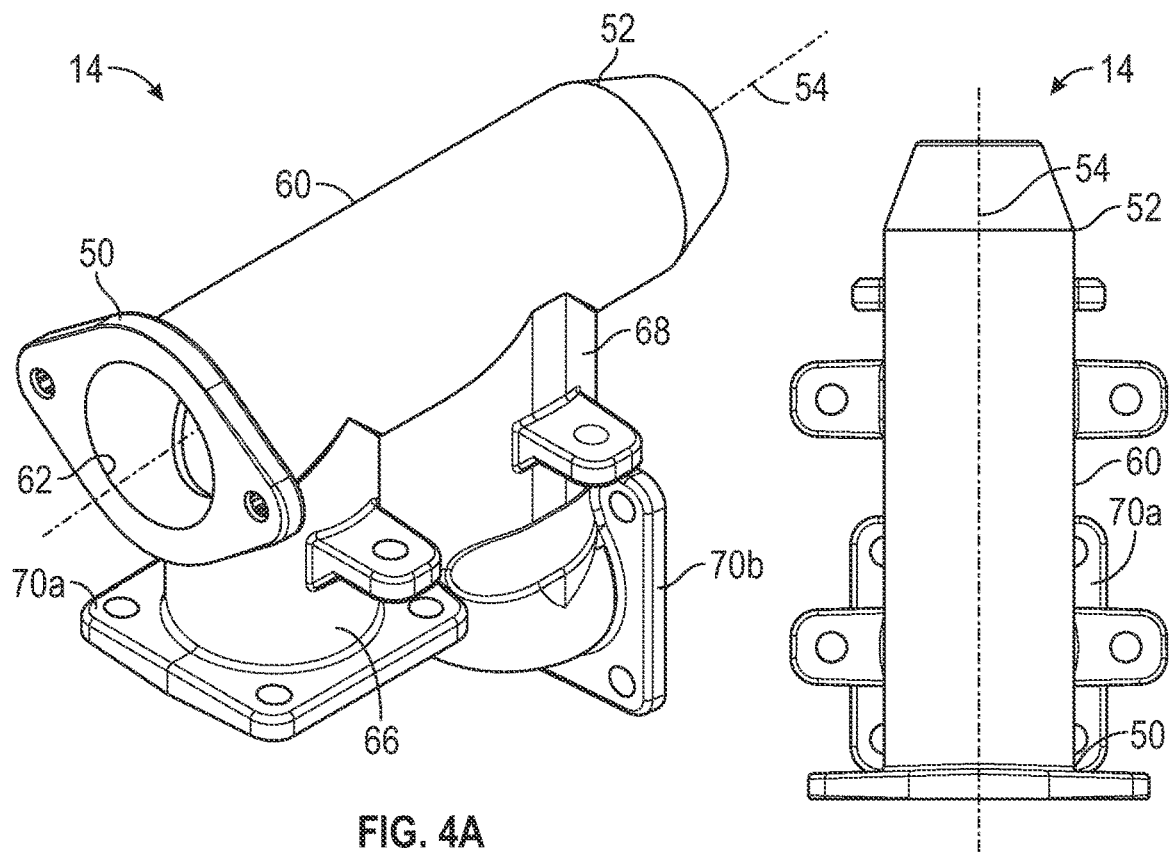
FIG. 4A
FIG. 4C
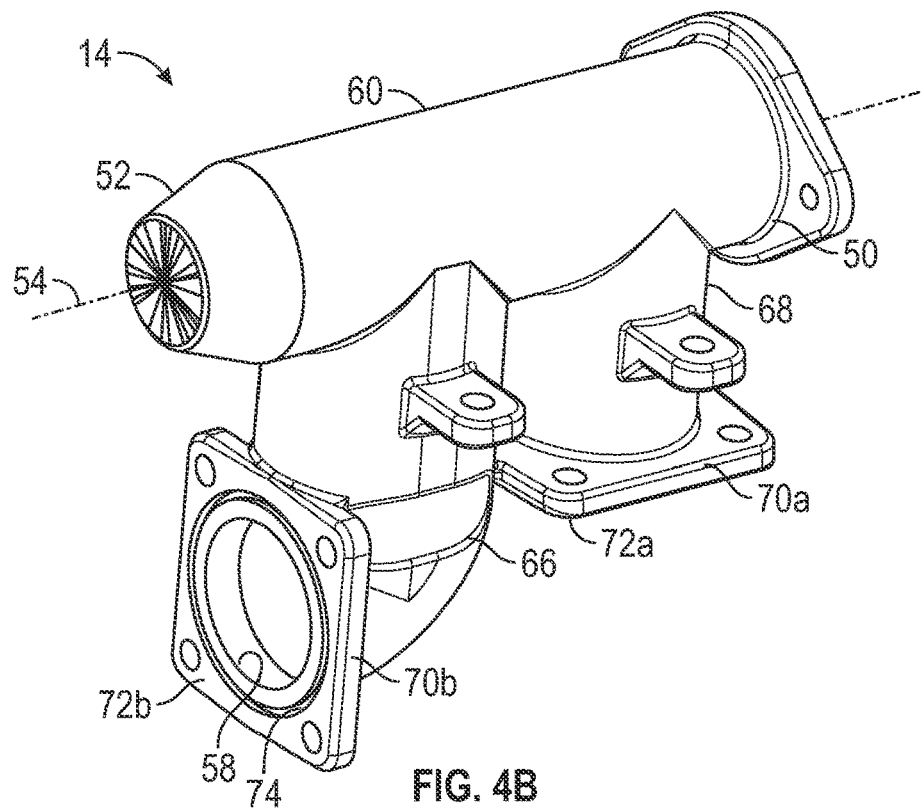
FIG. 4B

APPARATUS FOR THE TRANSFER AND DISTRIBUTION OF BULK LIQUIDS

BACKGROUND

The need to transfer fluid from one container to another is nearly universal. Industries that utilize fluid in bulk typically provide storage containers at or near locations where fluids are being used regularly. To meet the needs of a particular industry, permanent, storage containers may be constructed, or portable storage tanks may be used if fluid is only needed for a short duration. Additionally, fluid may be stored into transfer containers for transport to various locations. The storage and transportation of fluid typically requires the controlled transfer of fluid from one container to another. For example, in the petroleum industry, crude oil is transported via transfer containers and stored in storage containers.

In the fuel transportation industry, vehicles are used to transport liquids over the roads for delivery to various locations. For example, gas tanker vehicles having storage containers are commonly used to provide gasoline to retail gas stations. Retail gas stations typically have installed aboveground storage tanks for storing gasoline. Retail gas stations contract with fuel delivery companies for the regular delivery of gasoline in bulk.

To provide fuel delivery services, a gas tanker vehicle having a storage container, must be first filled with fuel for delivery. Gas tanker vehicles are generally equipped with fuel transfer pumps to accomplish the transfer of fuel. These fuel transfer pumps are typically mounted on one side of the truck, which requires the driver of the gas tankers to be particular about orienting the vehicle during deliveries to place the fuel transfer pump in an accessible location to the aboveground storage unit. Given the varying layouts of retail gas stations, particularly with respect to the location of aboveground storage tanks, and the position of the mounted fuel delivery pump, drivers of gas tankers are often faced with the challenge of pulling and manipulating several feet of hoses around the truck and other gas station features to make fuel deliveries. Further, typically, these fuel transfer pumps require disassembly and reassembly if a driver wishes to change the operation of the pump from a discharge mode to a suction mode.

A need exists for an apparatus for transferring a liquid. It is to such an apparatus that the inventive concepts disclosed and claimed herein are directed.

SUMMARY OF THE INVENTIVE CONCEPTS

The inventive concepts disclosed and claimed herein generally relate to an apparatus for transferring a liquid. The apparatus includes a conduit, a strainer housing, and a flow control reversing valve. The conduit has a first end, a second end, and a longitudinal centerline extending from the first end of the conduit to the second end. The first end of the conduit has an outlet, and the second end of the outlet has an inlet. The apparatus may be coupled to a pump; the inlet of the conduit is connectable to an outlet of the pump. The strainer housing has a strainer basket contained therein, and a first end, a second end, and a longitudinal centerline extending from the first end of the strainer housing to the second end of the strainer housing. The first end of the strainer housing has an inlet, and the second end of the strainer housing has an outlet. The outlet of the strainer housing is connectable to an inlet of the pump. The flow control reversing valve has a valve body and a valve member. The valve body has a front side, a rear side, a first side, a second side opposite the first side, a top side, a bottom side, and a longitudinal centerline extending from the front side to the rear side. The first side has a first port that is connectable to a first containment vessel, and the second side has second port that is connectable to a second containment vessel. The bottom side has an inlet connected to the outlet of the conduit, and the top side has an outlet connected to the inlet of the strainer housing. The valve member is movable between a first position and a second position. In the first position liquid flows from the first port to the second port, and in the second position, liquid flows from the second port to the first port. Each of the longitudinal centerlines of the conduit, the strainer housing, and the flow control reversing valve is substantially vertically aligned with one another.

BRIEF DESCRIPTION OF THE DRAWINGS

To assist those of ordinary skill in the relevant art in making and using the inventive concepts disclosed herein, reference is made to the appended drawings and schematics, which are not intended to be drawn to scale, and in which like reference numerals are intended to refer to the same or similar elements for consistency. For purposes of clarity, not every component may be labeled in every drawing. Certain features and certain views of the figures may be shown exaggerated and not to scale or in schematic in the interest of clarity and conciseness. In the drawings:

FIG. 4A is a perspective view of a strainer housing.

FIG. 4B is a rear perspective view of the strainer housing of FIG. 4A.

FIG. 4C is a top plan view of the strainer housing of FIG. 4A.

DETAILED DESCRIPTION OF EXEMPLARY EMBODIMENTS

Figure 1:
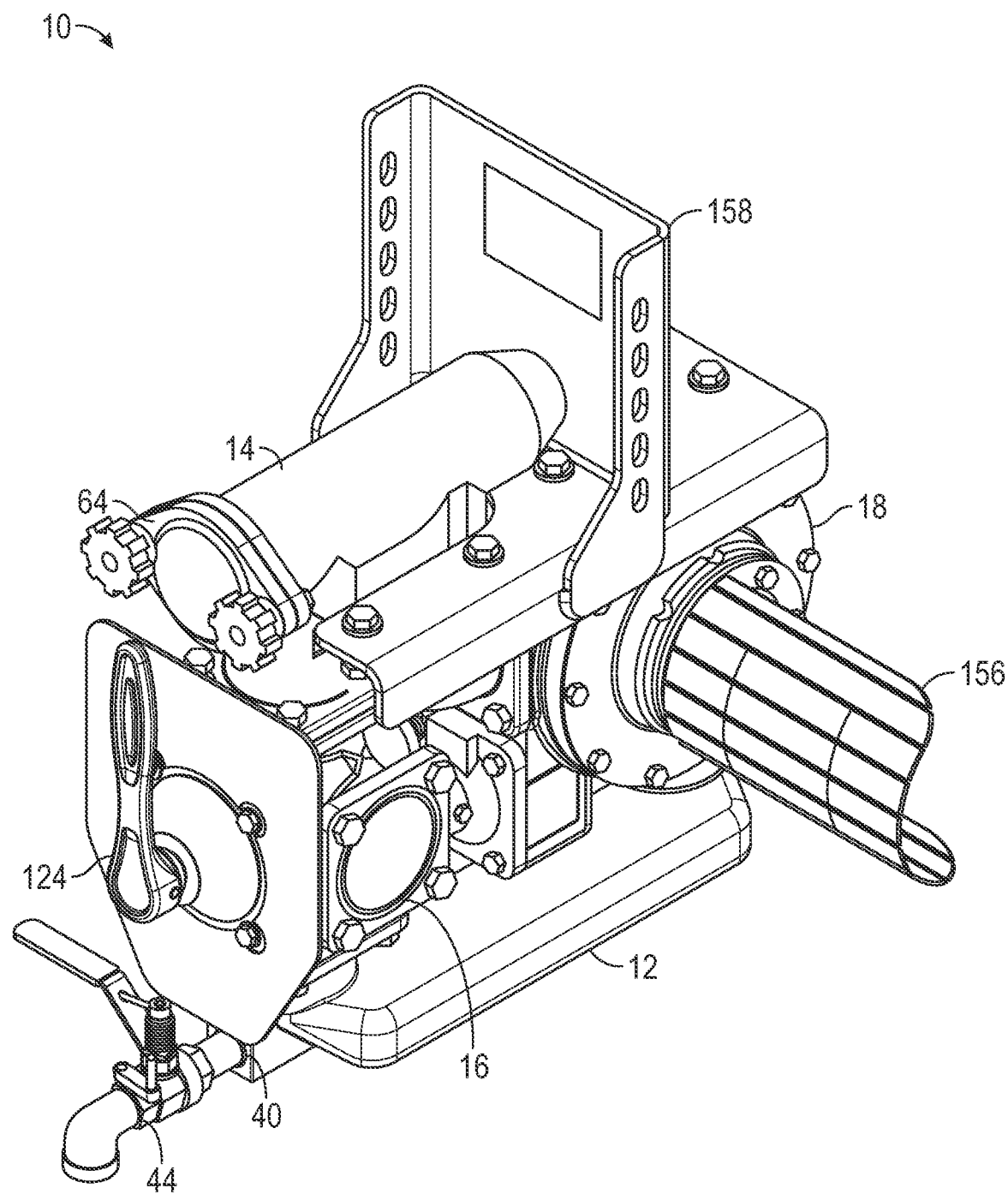
FIG. 1 is a side perspective view of an exemplary embodiment of an apparatus for transferring and distributing bulk liquids according to the inventive concepts disclosed herein shown coupled to a pump.

Before explaining at least one embodiment of the inventive concept(s) in detail by way of exemplary drawings, experimentation, results, and laboratory procedures, it is to be understood that the inventive concept(s) is not limited in its application to the details of construction and the arrangement of the components set forth in the following description or illustrated in the drawings, experimentation and/or results. The inventive concept(s) is capable of other embodiments or of being practiced or carried out in various ways. The language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Unless otherwise defined, scientific and technical terms used in connection with the presently disclosed and claimed inventive concept(s) shall have the meanings commonly understood by those of ordinary skill in the art. Further, unless otherwise required by context, singular terms shall include pluralities and plural terms shall include the singular. The foregoing techniques and procedures are generally performed according to conventional methods well known in the art and as described in various general and more specific references cited and discussed throughout the present specification. The nomenclatures utilized in connection with, and the laboratory procedures and techniques of, analytical chemistry, synthetic organic chemistry, and medicinal and pharmaceutical chemistry described herein are those well-known and commonly used in the art. Standard techniques are used for chemical syntheses and chemical analyses.

All the articles, compositions and/or methods disclosed and claimed herein can be made and executed without undue experimentation, given the present disclosure. While the articles, compositions and methods of the inventive concept (s) have been described in terms of preferred embodiments, it will be apparent to those of skill in the art that variations may be applied to the articles, compositions and/or methods and in the steps or in the sequence of steps of the methods described herein without departing from the concept, spirit and scope of the inventive concept(s). All such similar substitutes and modifications apparent to those skilled in the art are deemed to be within the spirit, scope and concept of the inventive concept(s) as defined by the appended claims.

As utilized under the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one."

The use of the term "or" in the claims is used to mean "and/or" unless explicitly indicated to refer to alternatives only or the alternatives are mutually exclusive, although the disclosure supports a definition that refers to only alternatives and "and/or."

Throughout this application, the term "about" is used to indicate that a value includes the inherent variation of error for the device, the method being employed to determine the value, or the variation that exists among the study subjects.

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

In the following detailed description of embodiments of the inventive concept, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
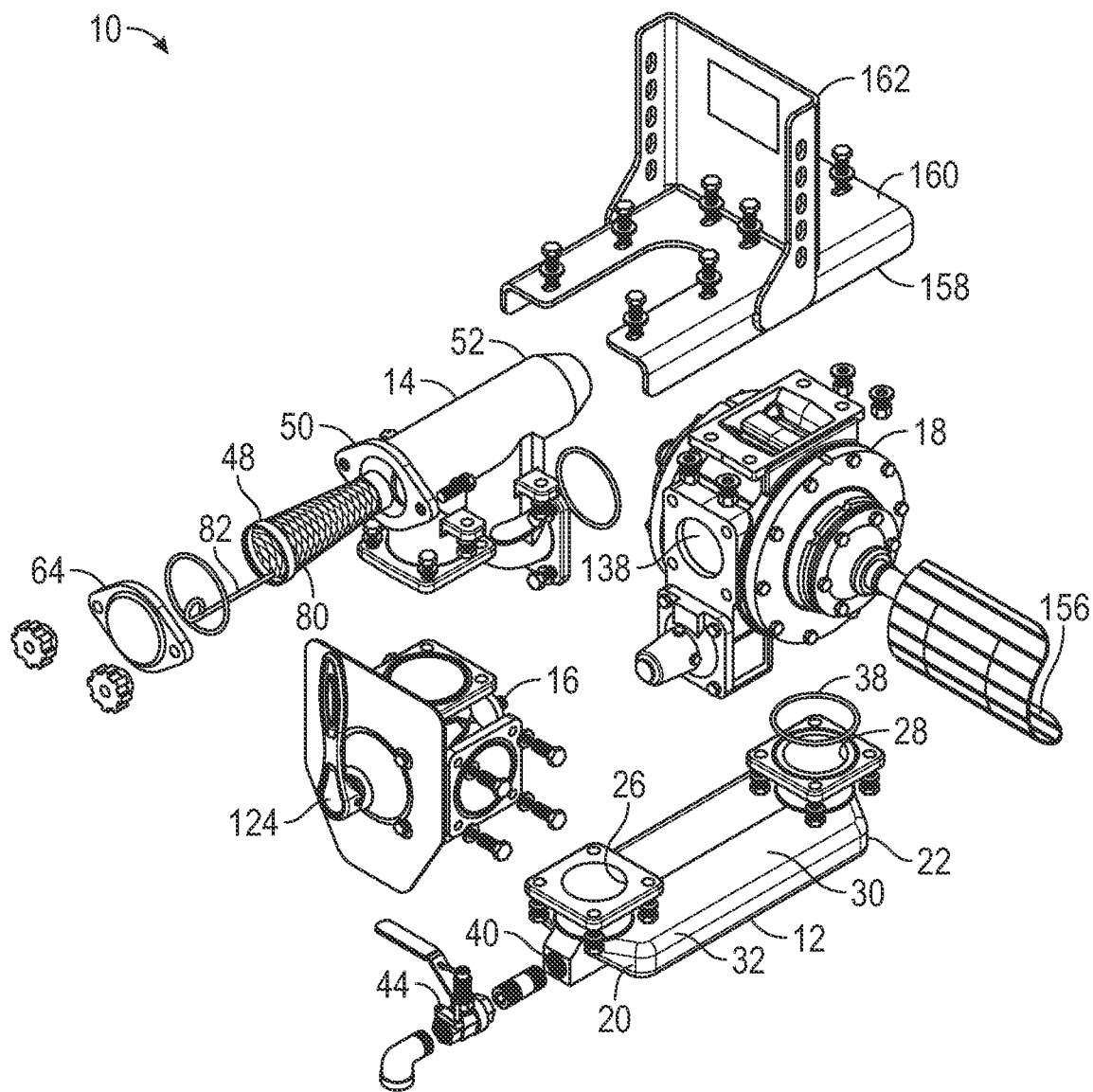
FIG. 2 is an exploded view of the apparatus of FIG. 1.

Referring now to the drawings, and more particularly to FIGS. 1-5B, shown therein is an exemplary embodiment of an apparatus 10 for transferring and distributing bulk liquids in accordance with the inventive concepts disclosed and claimed herein. The apparatus 10 includes a conduit 12, a strainer housing 14, and a flow control reversing valve 16. The apparatus 10 is couplable to a pump 18, as shown in FIGS. 1 and 2.

The conduit 12 includes a first end 20, a second end 22, and a longitudinal centerline 24 extending from the first end 20 of the conduit 12 to the second end 22 of the conduit. The conduit 12 may be of any suitable size and shape, and formed of any suitable material used to transport liquid, such as, without limitation, cast iron, fiber glass, polyethylene, polyvinylchloride, stainless steel, carbon steel, or alloy steel. In one embodiment, the conduit may be formed of 316 stainless steel. The first end 20 of the conduit 12 has an outlet 26 and the second end 22 of the conduit 12 has an inlet 28. The conduit 12 may be fluidly couplable to the pump 18 and the flow control reversing valve 16, as discussed in further detail below.

Figure 3A:
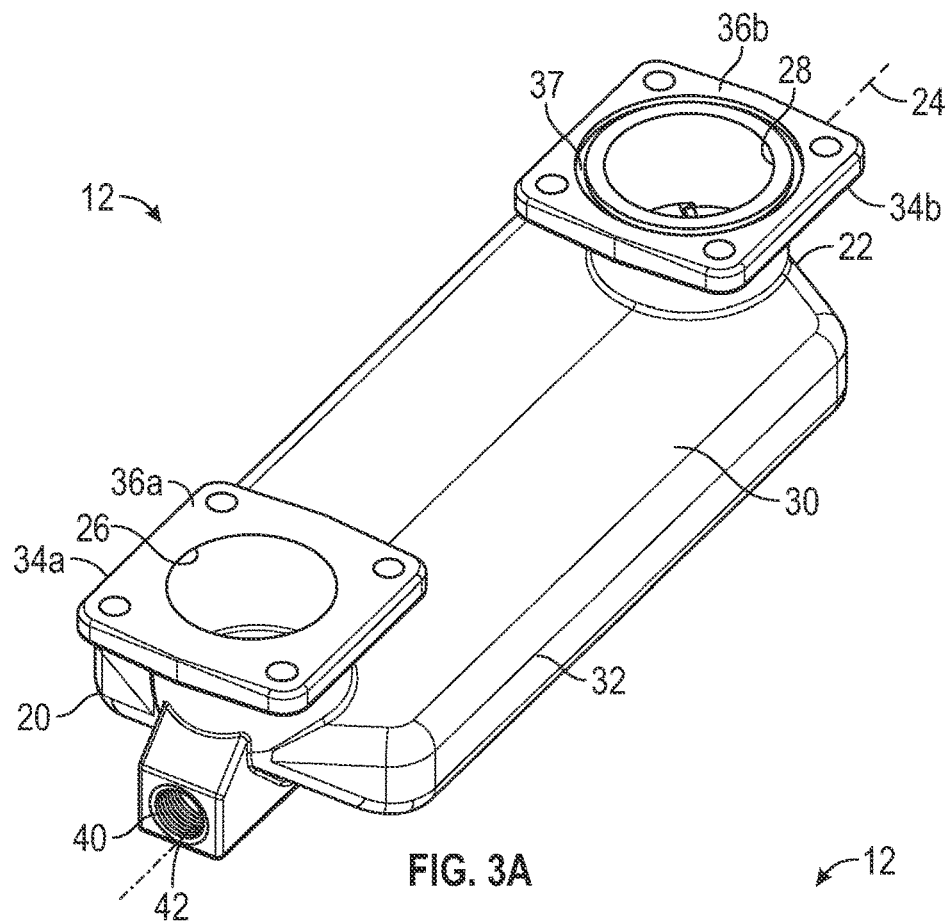
FIG. 3A is a perspective view of a conduit.
Figure 3B:
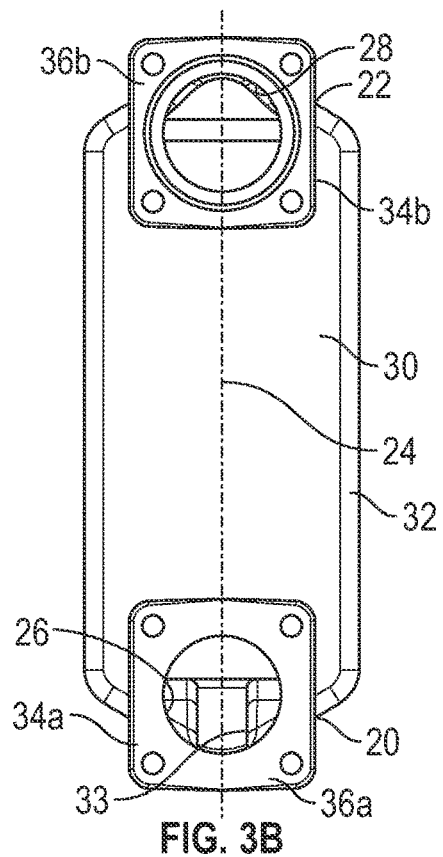
FIG. 3B is a top plan view of the conduit of FIG. 3A.

Referring now to FIGS. 3A and 3B, shown therein is a perspective view and top plan view of the conduit 12, respectively. The conduit 12 further comprises a top surface 30, and a sidewall 32 extending between the first end 20 of the conduit 12 and the second end 22 of the conduit 12. The sidewall 32 of the conduit defines an interior passageway 33 extending through the conduit 12 from the first end 20 of the conduit 12 to the second end 22 of the conduit 12 for receiving and permitting the flow of liquid from the first end 20 to the second end 22. The interior passageway 33 of the conduit 12 is in fluid communication with the inlet 28 and the outlet 26 of the conduit 12.

The inlet 28 of the conduit 12 and the outlet 26 of the conduit 12 may have a cross-section of any suitable geometry, including, but not limited to, circular, oval, square, or rectangular. The inlet 28 of the conduit 12 and the outlet 26 of the conduit 12 may be molded or cut into the conduit 12, or otherwise pre-fabricated. A mating flange 34a, 34b may be formed and/or otherwise secured to the perimeter of each of the inlet 28 and the outlet 26 of the conduit at the top surface 30. In some embodiments, the mating flanges 34a, 34b may extend away from the top surface 30 of the conduit 12. Each of the mating flanges 34a, 34b has a mating face 36a, 36b, and least one of the inlet 28 and the outlet 26 of the conduit has a groove 37 to receive a seal, such as an O-ring 38, that may be at least partially disposed within the mating flange 34 to ensure a fluid-tight seal across the inlet 28 and the outlet 26 of the conduit 12 during use. The mating flanges 34 may be of any suitable size and shape.

The conduit 12 further includes a purge drain 40 positioned at the second end 22 of the conduit 12. The purge drain 40 may be in fluid communication with the interior passageway 33 of the conduit 12, and configured to drain substantially all the fluid contained within and/or passing through the interior passageway of the conduit 12. The purge drain 40 may be surrounded by at least a portion of the sidewall 32 of the conduit 12 and may extend away from the longitudinal centerline 24 of the conduit 12 at a first angle relative to the longitudinal centerline 24 of the conduit. The purge drain 40 may include an inner peripheral surface in which a threaded engagement portion 42 is formed for engaging a purge valve member 44. In some embodiments, the purge drain 40 may include a ball valve or spring-loaded valve to drain any liquid remaining in the conduit 12.

In one embodiment, the purge drain 40 is fluidly connected to the second end 22 of the conduit 12 and is substantially vertically aligned with the longitudinal centerline 24 of the conduit 12. In one embodiment, the inlet 28 and the outlet 26 of the conduit 12 are vertically aligned with the longitudinal centerline 24 of the conduit, as shown in FIG. 3B.

Referring now to FIGS. 4A-4C, shown therein is a perspective view, a rear-perspective view, and a top plan view of the strainer housing 14, in the order given. The strainer housing 14 is configured to house a strainer basket 48 (as shown in FIG. 2) and includes a first end 50, a second end 52, and a longitudinal centerline 54 extending from the first end 50 of the strainer housing 14 to the second end 52 of the strainer housing 14. The first end 50 of the strainer housing 14 has an inlet 56, and the second end 52 of the strainer housing 14 has an outlet 58. The strainer housing 14 may be of any suitable size and shape, and formed of any suitable material, such as, without limitation, cast iron, fiber glass, polyethylene, polyvinylchloride, stainless steel, carbon steel, or alloy steel. In one embodiment, the strainer housing 14 may be formed of 316 stainless steel.

The strainer housing 14 comprises a tubular portion 60 having a bore 62 extending therethrough. In one embodiment, as shown in FIGS. 4A-4C, the tubular portion 60 of the strainer housing 14 may be configured in the shape of a frustrum that tapers from the first end 50 of the strainer housing 14 towards the second end 52 of the strainer housing 14. The bore 62 may have a cross-section of any suitable geometry, including, but not limited to, circular, oval, square, or rectangular. The bore 62 may be sized to have a diameter adapted to slidably axially receive the strainer basket 48. In some embodiments, the strainer housing 14 may also include a cover plate 64, as shown in FIGS. 1 and 2. The cover plate 64 may be removably secured to a surface of the strainer housing 14 at the at the first end 50 of the strainer housing 14 to prevent the movement of the strainer basket 48.

The inlet 56 and the outlet 58 of the strainer housing 14 may have a cross-section of any suitable geometry, including, but not limited to, circular, oval, square, or rectangular. The inlet 56 and the outlet 58 of the strainer housing 14 may be molded or cut into the tubular portion 60 of the strainer housing 14, or otherwise pre-fabricated.

In some embodiments, the strainer housing 14 may further include an inlet pipe fitting 66 and an outlet pipe fitting 68 coupled to the inlet 56 and the outlet 58 of the strainer housing 14, respectively. The inlet pipe fitting 66 and the outlet pipe fitting 68 each include a mating flange 70a, 70b with each having a mating surface 72a, 72b, and at least one of the mating flanges 70 is secured to the inlet pipe fitting 66 or the outlet pipe fitting 68 has a groove 74 to receive a seal, such as an O-ring, that may be at least partially disposed within the mating flange 70 to ensure a fluid-tight seal across during use. The mating flanges 70 may be of any suitable size and shape. In some embodiments, the outlet pipe fitting 68 may be a 90-degree elbow pipe fitting, as shown in FIGS. 4A and 4B.

The strainer basket 48 is disposed within the strainer housing 14. The strainer basket 48 comprises a strainer screen 76 that extends substantially the entire length of the strainer basket 48. The strainer basket 48 is in fluid communication with the inlet 56 and outlet 58 of the strainer housing 14. Liquid flows from the inlet 56 of the strainer housing 14 and contacts the strainer screen 76 of the strainer basket 48. The strainer screen 76 entrains debris and/or particles suspended within the liquid onto a surface of the strainer screen 76. Once the liquid flows along the length of the strainer basket 48, the liquid passes into the outlet 58 of the strainer housing 14.

In some embodiments, as shown in FIG. 2, the strainer basket 48 may further include a lip 80 and a handle 82 mounted to the lip 80 of the strainer basket 48. The handle 82 may be utilized to remove the strainer basket 48 from the strainer housing 14, or otherwise permit the strainer basket 48 to be axially displaced relative to the bore 62 of the strainer housing 14.

Figure 5A:
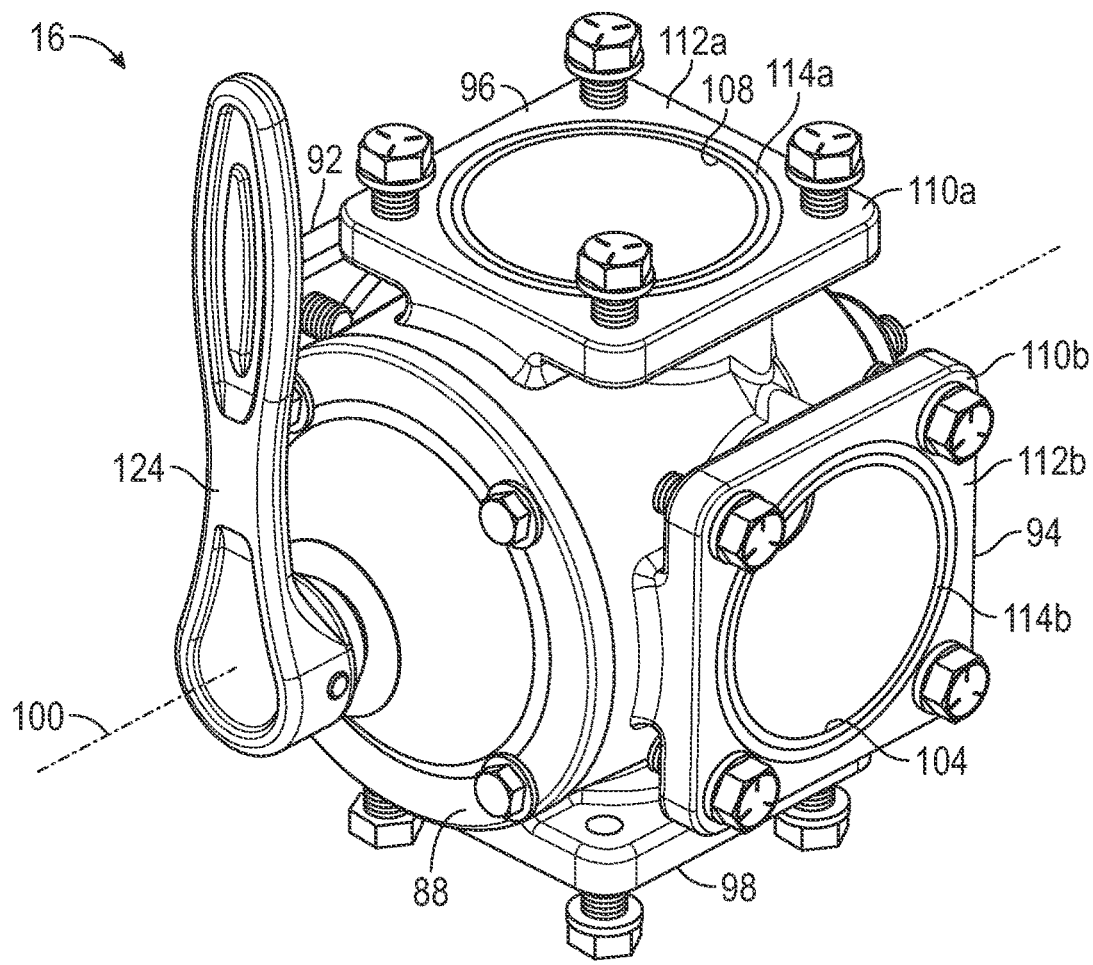
FIG. 5A is a perspective view of a flow control reversing valve.
Figure 5B:
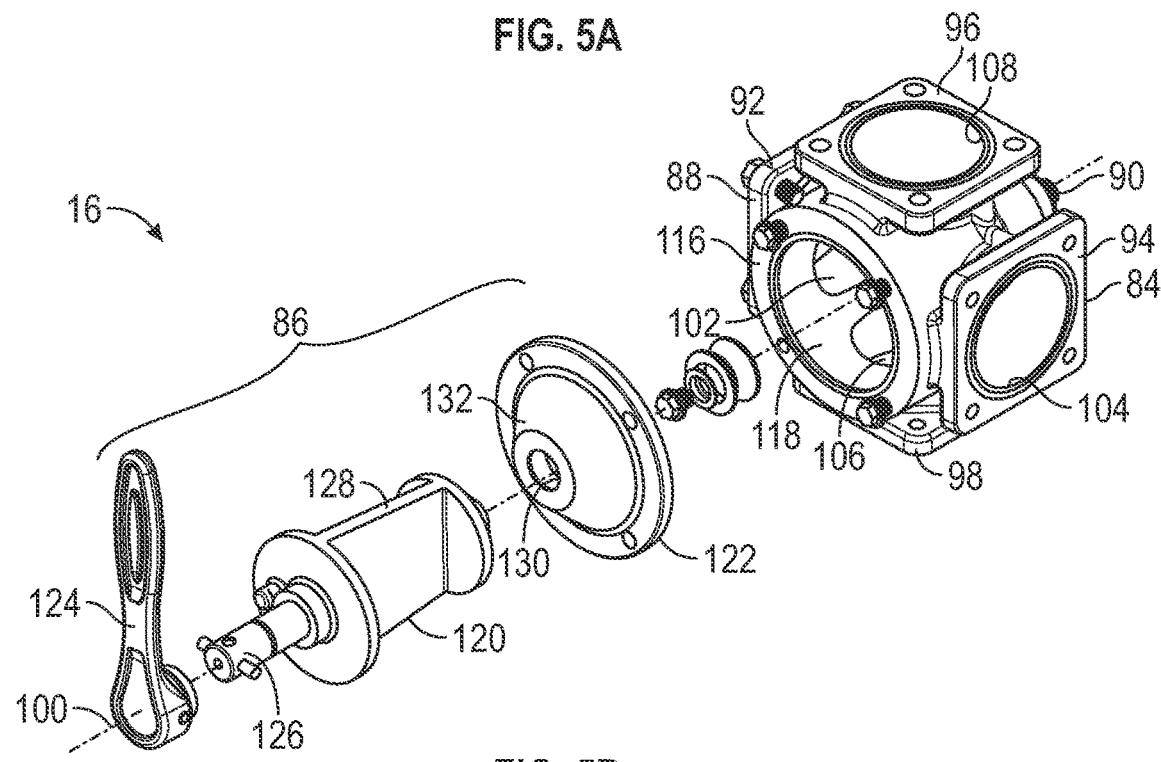
FIG. 5B is an exploded view of the flow control reversing valve of FIG. 5B.

Referring now to FIGS. 5A and 5B, shown therein is a perspective view of the flow control reversing valve 16, and an exploded view of the same, respectively. The flow control reversing valve 16 includes a valve body 84 and a valve member 86. The flow control reversing valve 16 may be formed of any suitable material, such as, without limitation cast iron, fiber glass, polyethylene, polyvinylchloride, stainless steel, carbon steel, or alloy steel. In one embodiment, the flow control reversing valve 16 is formed of 316 stainless steel.

The valve body 84 has a front side 88, a rear side 90, a first side 92, a second side 94 opposite the first side 92, a top side 96, a bottom side 98, and a longitudinal centerline 100 extending from the front side 88 to the rear side 90. The first side 92 has a first port 102 connectable to a first containment vessel (not shown), and the second side 94 has a second port 104 connectable to a second containment vessel (not shown). The bottom side 98 has an inlet 106 connected to the outlet 26 of the conduit 12, and the top side 96 has an outlet 108 connected to the inlet 56 of the strainer housing 14.

Each of the rear side 90, the first side 92, the second side 94, the top side 96, and the bottom side 98 is provided with a mating flange 110a-110e having a mating face 112a-112e. Each of the mating flanges 110a-110e includes a groove 114a-114e to receive a seal, such as an O-ring, to provide a seal across each of the mating faces 112a-112e. The front side 88 is provided with a first annular flange 116. The valve body 84 also includes an internal chamber 118.

The valve member 86 includes a valve diverter 120, a valve bonnet 122, and a valve handle 124. The valve diverter 120 includes a top shaft 126 having a distal end configured to receive the valve handle 124, a flat plate impeller 128, and a bottom shaft (not shown). The bottom shaft is configured to interact with the internal chamber 118 of the valve body 84.

The flat plate impeller 128 is shaped to cooperate with the internal chamber 118 of the valve body 84 to direct the flow of liquid that enters the flow control reversing valve 16 such as, for example, the flow of liquid in and out of the first port 102 and the second port 104. The flat plate impeller 128 and the bottom shaft of the valve candle 120 are configured to be seated in the internal chamber 118 of the valve body 84.

In some embodiments, the valve bonnet 122 includes a through hole 130 extending therethrough, a first surface 132, and an opposing second surface (not shown), as shown in FIG. 5B. The second surface is provided with a second annular flange (not shown) with a groove (not shown) to receive a seal, such as an O-ring, adapted to couple to the first annular flange 116 of the first side 92 of the valve body 84. The valve bonnet 122 is oriented with respect to the valve diverter 120 such that the through hole 130 of the valve bonnet 122 is aligned with the top shaft 126 of the valve diverter 120. At least a portion of the top shaft 126 extends through the through hole 130 from the second surface of the valve bonnet 122 to the first surface 132 of the valve bonnet 122. The valve handle 124 is secured to a portion of the top shaft 126 that extends through the through hole 130 from the first surface 132 of the valve bonnet 122.

Figure 6A:
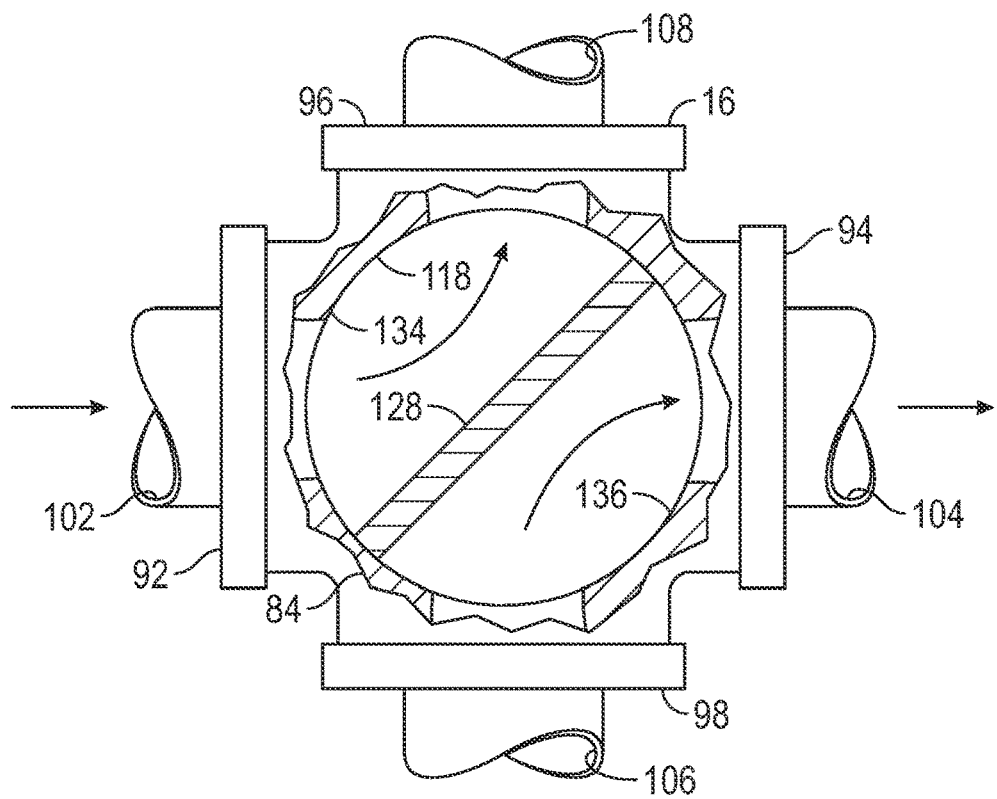
FIG. 6A is a schematic diagram of the flow control reversing valve in a first position.
Figure 6B:
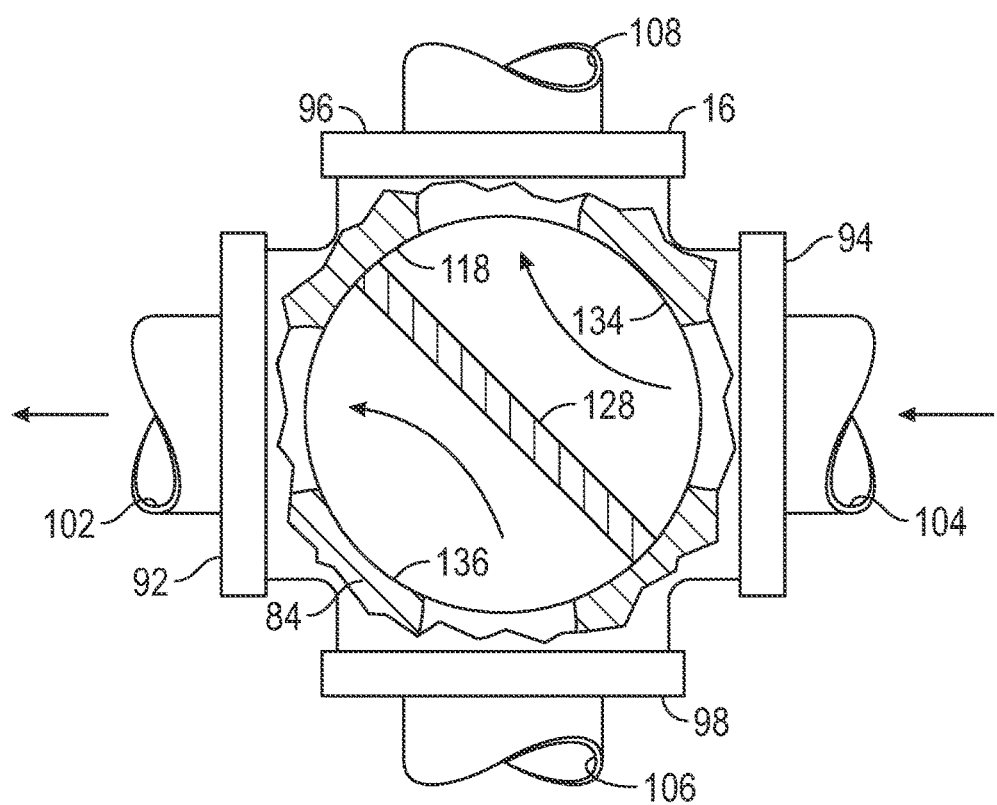
FIG. 6B is a schematic diagram of the flow control reversing valve in a second position.
Figure 6C:
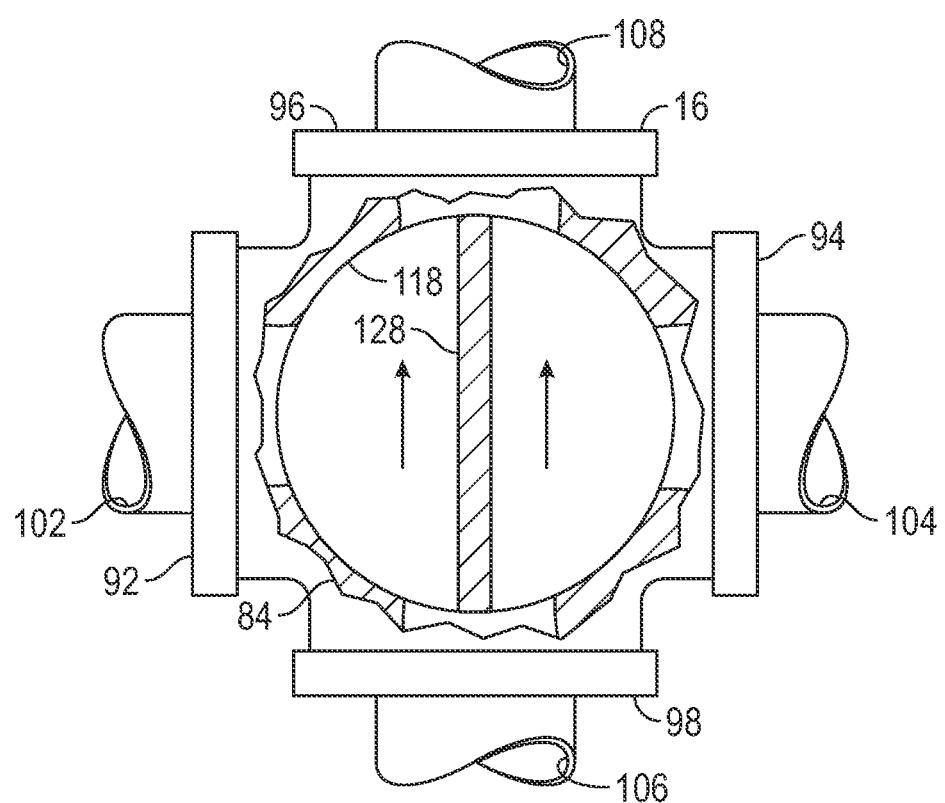
FIG. 6C is a schematic diagram of the flow control reversing valve in a third position.

The flow control reversing valve 16 is actuated by the valve handle 124, which is connected to the flow control reversing valve 16 via the valve diverter 120 for manually positioning the flow control reversing valve 16 between a first position (FIG. 6A), a second position (FIG. 6B), and a third position (FIG. 6C). The valve handle 124 is secured to the top shaft 126 of the valve diverter 120 such that the position of the valve handle 124 corresponds to the position of the flat plate impeller 128 in the internal chamber 118 of the valve body 84. The valve handle 124 is connected to the valve diverter 120 such that it is perpendicular to the longitudinal centerline 100 of the flow control reversing valve 16 when in a neutral position, as shown in FIGS. 5A and 6C, and allows for the flow control reversing valve 16 to be moved between its operative positions.

For example, the inlet 106 of the bottom side 98 and the outlet 108 of the top side 96 may be connected to the outlet 26 of the conduit 12 by axially aligning the mating flange 110a of the top side 96 and the mating flange 34a of the outlet 26 of the conduit 12 and moving them towards each other so as to bring the mating faces 112a, 36a of each into engagement. The mating flanges 110, 34 have mating faces 112, 36 complimentary to each other and are configured to accommodate a seal therebetween. The mating flanges 110, 34 may be secured to each other, for example, using bolts.

In some embodiments, the inlet 106 and the outlet 108 of the flow control reversing valve 16 are vertically aligned with the longitudinal centerline 100 of the flow control reversing valve 16, as shown in FIG. 5B. In one embodiment, the inlet 106 and the outlet 108 of the flow control reversing valve 16 are positioned orthogonal to the first port 102 and the second port 104.

Referring now to FIGS. 6A-6C, shown therein is a schematic diagram of the flow control reversing valve 16 illustrating the flow of liquid through the flow control reversing valve 16 in the first position, the second position, and the third position, respectively. The valve member 86 is moved to either the first position, the second position, or third position, which correspondingly rotates the flat plate impeller 128 within the internal chamber 118 of the valve body 84 to form a first passageway 134 and a second passageway 136. In the first position, liquid enters the flow control reversing valve 16 through the first port 102 and into the first passageway 134 which permits flow of liquid to the second port 104 via the second passageway 136, as shown in FIG. 6A. In the second position, liquid enters the flow control reversing valve 16 through the second port 104 and into the first passageway 134 which permits flow of liquid to the first port 102 via the second passageway 136, as shown in FIG. 6B. When the flow control reversing valve 16 is positioned in the third position (i.e., a neutral position), the flat plate impeller 128 of the valve member 86 is oriented vertically so liquid flow is prevented between the first port 102 to the second port 104, and between the second port 104 to the first port 102. The third position allows the pump 18 to operate without moving fluid from the first port 102 to the second port 104 and vice versa because flow or pressure differential is not developed between the first port 102 and the second port 104. In one mode, the liquid recirculates between the flow control reversing valve 16 and the pump 18.

Figure 7A:
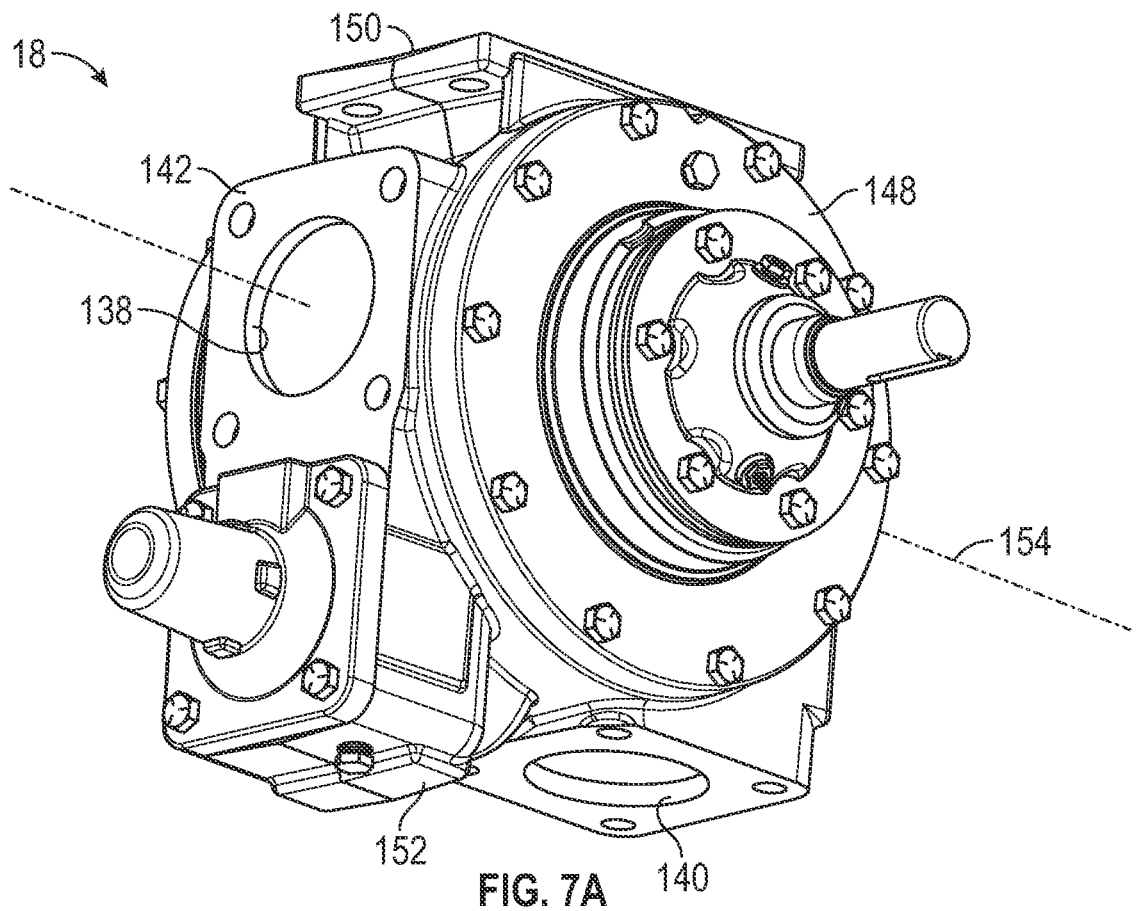
FIG. 7A is a perspective view of a pump that is couplable to the apparatus of FIG. 1.
Figure 7B:
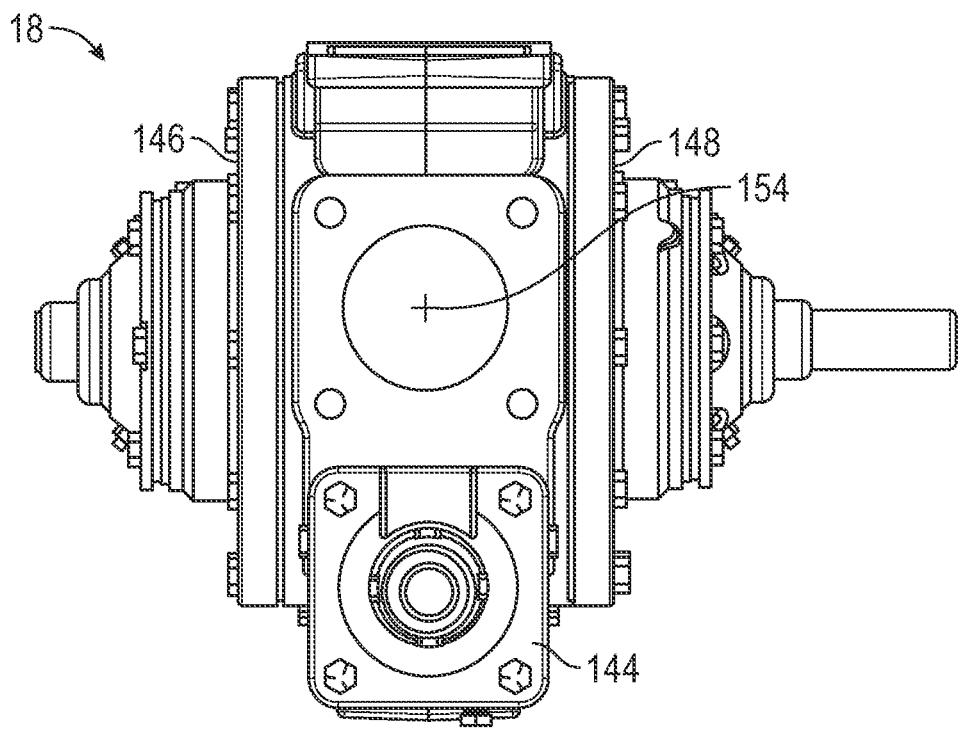
FIG. 7B is a front elevational view of the pump of FIG. 7A.

Referring now to FIGS. 7A and 7B, shown therein is a perspective view and front elevational view of the pump 18 that is couplable to the apparatus 10.

The pump 18 has an inlet 138, an outlet 140, a front side 142, a rear side 144, a first side 146, a second side 148 opposite the first side 146, a top side 150, a bottom side 152, and a longitudinal centerline 154 extending from the front side 142 to the rear side 144. In some embodiments, the pump 18 may further include a guard 156 releasably secured to the second side 148 of the pump, as shown in FIGS. 1 and 2.

The inlet 138 of the pump 18 is positioned on the front side 142 of the pump 18, and the outlet 140 of the pump 18 is positioned on the bottom side 152 of the pump. When the apparatus 10 is coupled to the pump 18, as shown in FIGS. 1 and 2, the outlet 140 of the pump 18 is fluidly connected to the inlet 28 of the conduit 12, and the inlet 138 of the pump 18 is fluidly connected to the outlet 58 of the strainer housing 14.

When the valve member 86 of the flow control reversing valve 16 is in the first position, the pump 18 circulates liquid through the apparatus 10. A first containment vessel (not shown) containing a liquid may be fluidly coupled to the first port 102 of the flow control reversing valve 16 and a second containment vessel (not shown) adapted to receive a volume of liquid is fluidly connected to the second port 104 of the flow control reversing valve 16. The pump 18 may then be engaged to pump liquid from the first containment vessel to the flow control reversing valve 16 via the first port 102. From the first port 102, the liquid may flow to the inlet 56 of the strainer housing 14 and contact the strainer basket 48 contained therein. Any debris or particles suspended in the liquid may be entrained onto a surface of the strainer basket 48 before the strained liquid exits the strainer housing 14 via the outlet 58 of the strainer housing 14. The liquid may then flow to the inlet 138 of the pump 18 before entering the inlet 28 of the conduit 12 via the outlet 140 of the pump 18. The liquid may then travel through interior passageway of the conduit 12 before exiting the conduit 12 via the outlet 26 of the conduit 12, and the liquid may re-enter the flow control reversing valve 16 via the inlet 106 of the flow control reversing valve 16. The liquid may then flow into the second containment vessel via the second port 104 of the flow control reversing valve 16.

When the valve member 86 of the flow control reversing valve 16 is in the second position, the pump 18 circulates liquid through the apparatus 10. A second containment vessel containing a liquid may be fluidly coupled to the second port 104 of the flow control reversing valve 16, and a first containment vessel adapted to receive a volume of liquid is fluidly connected to the first port 102 of the flow control reversing valve 16. The pump 18 may then be engaged to pump liquid from the second containment vessel to the flow control reversing valve 16 via the second port 104. From the second port 104, the liquid may flow to the inlet 56 of the strainer housing 14 and contact the strainer basket 48 contained therein. Any debris or particles suspended in the liquid may be entrained onto a surface of the strainer basket 48 before the strained liquid exits the strainer housing 14 via the outlet 58 of the strainer housing 14. The liquid may then flow to the inlet 106 of the pump before entering the inlet 28 of the conduit 12 via the outlet 140 of the pump 18. The liquid may then travel through the interior passage way of the conduit 12 before exiting the conduit 12 via the outlet 26 of the conduit 12, and the liquid may then re-enter the flow control reversing valve 16 via the inlet 106 of the flow control reversing valve 16. The liquid may then flow into the first containment vessel via the first port 102 of the flow control reversing valve 16.

When the valve member 86 of the flow control reversing valve 16 is in the third position, the pump 18 circulates liquid through the apparatus 10

The pump 18 may also be used to discharge any fluid retained in the flow control reversing valve 16, the pump 18, and/or the conduit 12 via the purge drain 40. To discharge remaining liquid, the first port 102 and the second port 104 are decoupled from the first containment vessel and the second containment vessel, respectively, before the pump 18 is engaged. While the pump 18 is operating (e.g., in the third or neutral position), the purge drain 40 is opened so that fluid retained in the flow control reversing valve 16, the pump 18, and/or the conduit 12 may be drained.

The apparatus 10 may further comprise a pump mounting bracket 158, as shown in FIGS. 1 and 2. The pump mounting bracket 158 may include a securing surface 160 and a mounting surface 162. The securing surface 160 of the mounting bracket 158 may be attached to at least a portion of the pump 18, the strainer housing 14, and the flow control reversing valve 16. The apparatus 10 may be mounted to, for example, on a vehicle by securing the mounting surface 162 of the pump mounting bracket 158 to, for example, a supporting surface of the vehicle.

Figure 8A:
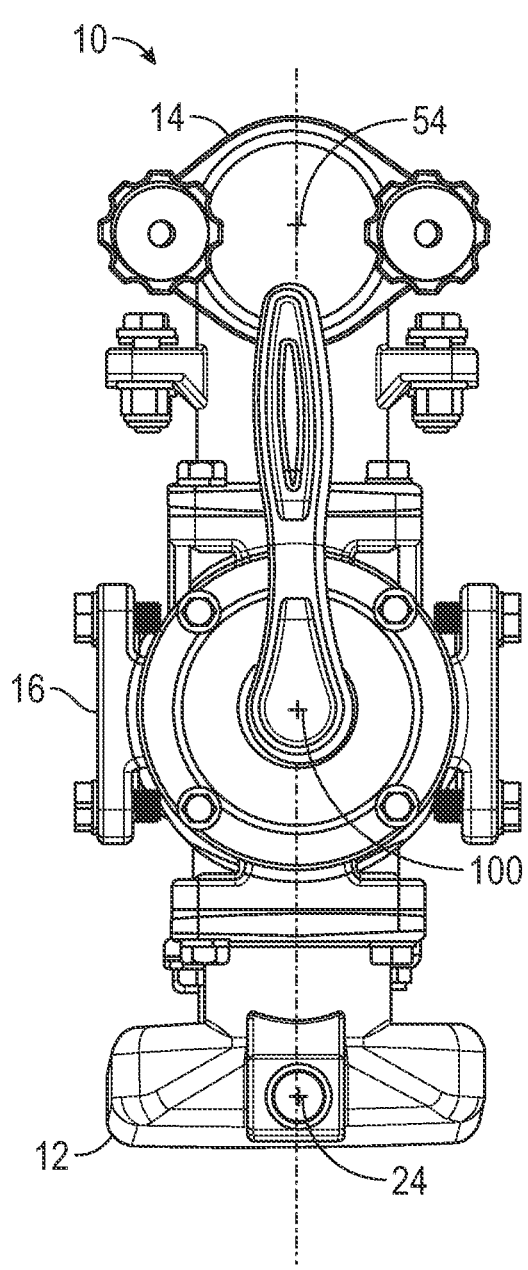
FIG. 8A is a front elevational view of the apparatus of FIG. 1.
Figure 8B:
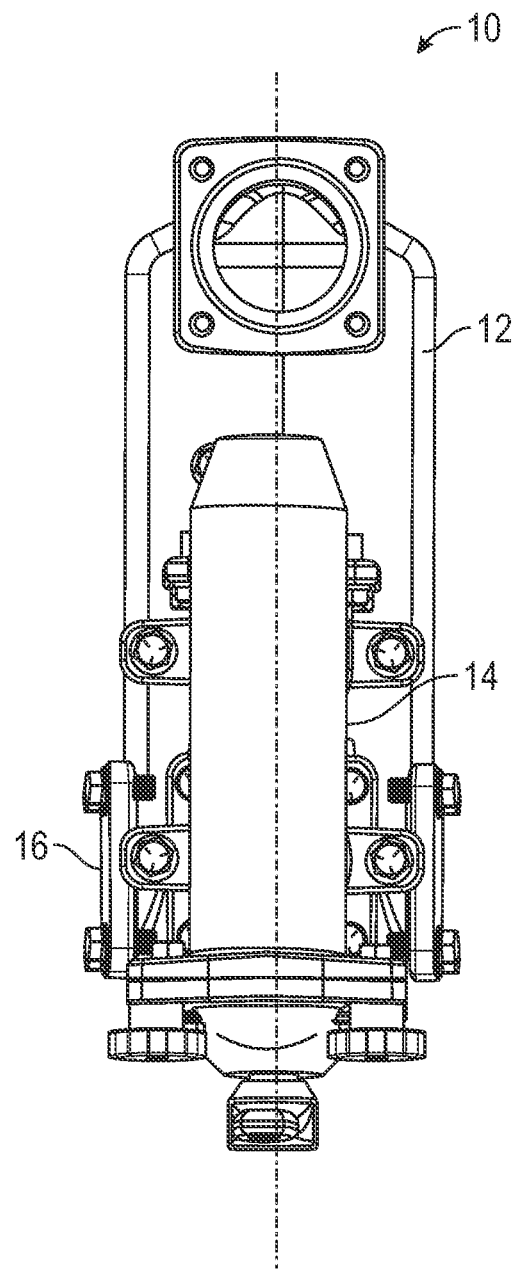
FIG. 8B is a top plan view of the apparatus of FIG. 1.

Referring now to FIGS. 8A and 8B, shown therein is a front elevational view and top plan view of the apparatus 10, respectively.

To permit unobstructed bilateral access to the first port 102 and the second port 104 of the flow control reversing valve 16, the strainer housing 14, the flow control reversing valve 16, and the conduit 12 are sized, shaped, and oriented such that the longitudinal centerline 54 of the strainer housing 14, the longitudinal centerline 100 of the flow control reversing valve 16, and the longitudinal centerline 24 of the conduit 12 are substantially vertically aligned with one another, as shown in FIG. 8A.

More particularly, when the inlet 56 of the strainer housing 14 is connected to the outlet 108 of the flow control reversing valve 16, the outlet 58 of the strainer housing 14 is connected to the inlet 138 of the pump 18, and the outlet 140 of the pump 18 is connected to the inlet 28 of the conduit 12, and the outlet 26 of the conduit is connected to the inlet 138 of the pump 18, the strainer housing 14 is substantially vertically aligned with the longitudinal centerline 100 of the flow control reversing valve 16, which is substantially vertically aligned with the longitudinal centerline 154 of the pump 18, which is substantially vertically aligned with the longitudinal centerline 24 of the conduit. Further, in that configuration, the inlet 56 of the strainer housing 14, the outlet 108 of the flow control reversing valve 16, and the outlet 26 of the conduit 12 are substantially vertically aligned with one another.

In one embodiment, the strainer housing 14 is positioned above the flow control reversing valve 16 and the conduit 12, as shown in FIG. 8A. In that embodiment, the longitudinal centerline 54 of the strainer housing 14 is substantially vertically aligned with the longitudinal centerline 100 of the flow control reversing valve 16 and the longitudinal centerline 24 of the conduit 12.

In another embodiment, the conduit 12 is positioned below the flow control reversing valve 16, as shown in FIG. 8A. In that embodiment, the longitudinal centerline 24 of the conduit 12 is substantially vertically aligned with the longitudinal centerline 100 of the flow control reversing valve 16.

Figure 9A:
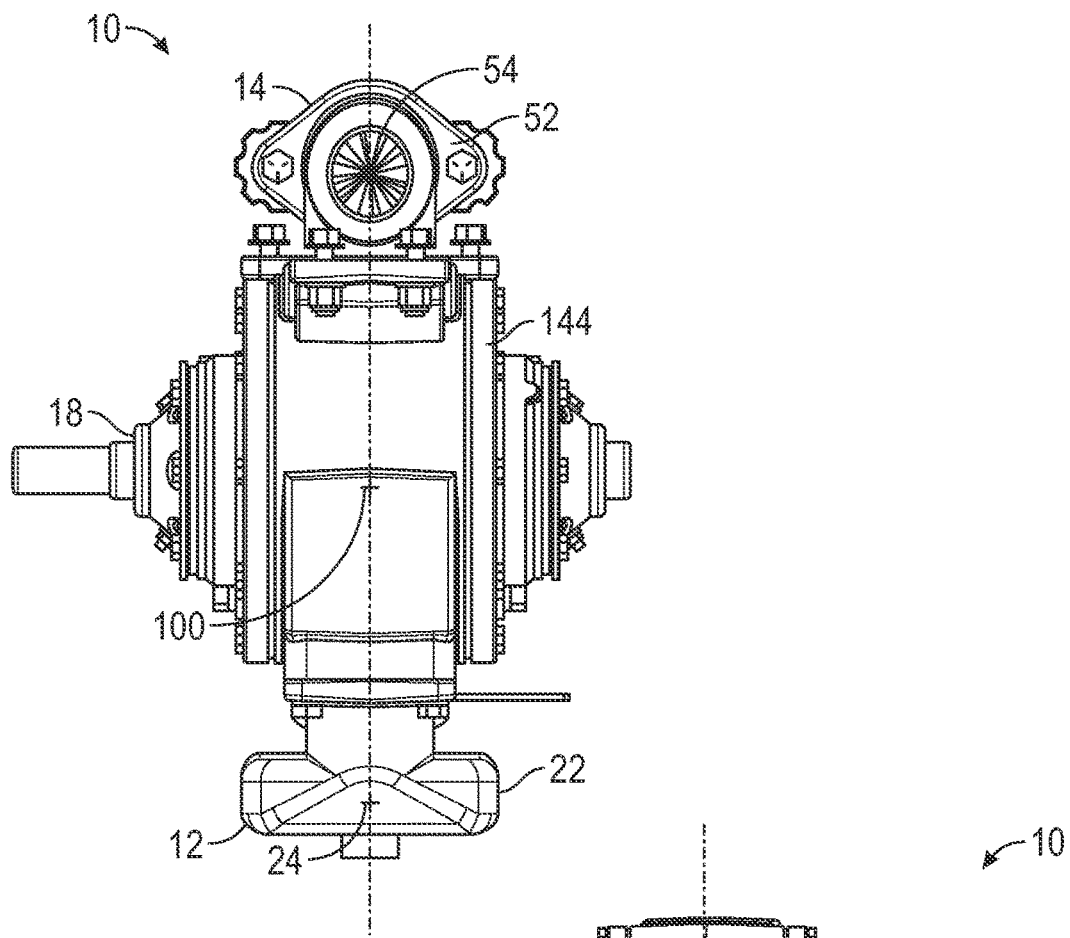
FIG. 9A is a bottom plan view of the apparatus of FIG. 1 shown coupled to the pump.
Figure 9B:
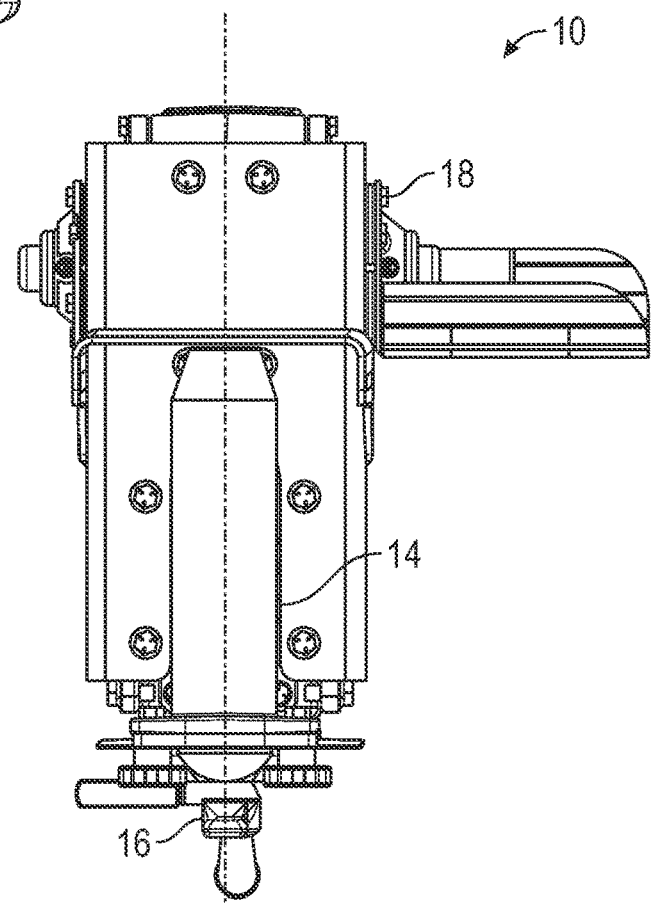
FIG. 9B is a top plan view of the apparatus of FIG. 1 shown coupled to the pump.

Similarly, when the apparatus 10 is coupled to the pump 18, as shown in FIGS. 9A and 9B, the pump 18 is sized, shaped, and oriented such that the longitudinal centerline 154 of the pump 18 is substantially vertically aligned with the longitudinal centerline 54 of the strainer housing 14, the longitudinal centerline 100 of the flow control reversing valve 16, and the longitudinal centerline 24 of the conduit 12, and the strainer housing 14, flow control reversing valve 16, and conduit 12 are oriented such that each is vertically aligned with the longitudinal centerlines 54, 100, 24 of each other.

From the above description, it is clear that the inventive concept(s) disclosed herein is well adapted to carry out the objects and to attain the advantages mentioned herein as well as those inherent in the inventive concept disclosed herein. While exemplary embodiments of the inventive concept disclosed herein have been described for purposes of this disclosure, it will be understood that numerous changes may be made which will readily suggest themselves to those skilled in the art and which are accomplished without departing from the scope of the inventive concept disclosed herein and defined by the appended claims.

What is claimed is:

1. An apparatus for distributing a liquid, comprising:
   a conduit having a first end, a second end, and a longitudinal centerline extending from the first end of the conduit to the second end of the conduit, the first end of the conduit having an outlet and the second end of the conduit having an inlet, the inlet of the conduit connectable to an outlet of a pump;
   a strainer housing having a strainer basket contained therein, the strainer housing having a first end, a second end, and a longitudinal centerline extending from the first end of the strainer housing to the second end of the strainer housing, the first end of the strainer housing having an inlet and the second end of the strainer housing having an outlet, the outlet of the straining housing connectable to an inlet of the pump; and a flow control reversing valve having a valve body and a valve member, the valve body having a front side, a rear side, a first side, a second side opposite the first side, a top side, and a bottom side, and a longitudinal centerline extending from the front side to the rear side, the first side having a first port connectable to a first containment vessel and the second side having a second port connectable to a second containment vessel, the bottom side having an inlet connected to the outlet of the conduit, and the top side having an outlet connected to the inlet of the strainer housing, the valve member movable between a first position wherein liquid flows from the first port to the second port and a second position wherein liquid flows from the second port to the first port, wherein each of the longitudinal centerlines of the conduit, the strainer housing, and the flow control reversing valve is substantially vertically aligned with one another.

2. The apparatus of claim 1, wherein the strainer housing is positioned above the flow control reversing valve and the conduit.

3. The apparatus of claim 1, wherein the conduit is positioned below the flow control reversing valve.

4. The apparatus of claim 1, wherein the inlet and the outlet of the flow control reversing valve are vertically aligned with the centerline of the flow control reversing valve.

5. The apparatus of claim 1, wherein the inlet and the outlet of the strainer housing are vertically aligned with the centerline of the strainer housing.

6. The apparatus of claim 5, wherein the inlet and the outlet of the conduit are vertically aligned with the centerline of the conduit.

7. The apparatus of claim 1, wherein the inlet and the outlet of the flow control reversing valve are vertically aligned with the centerline of the flow control reversing valve, wherein the inlet and the outlet of the strainer housing are vertically aligned with the centerline of the strainer housing, and wherein the inlet and the outlet of the conduit are vertically aligned with the centerline of the conduit.

8. The apparatus of claim 1, wherein the inlet and the outlet of the flow control reversing valve are positioned orthogonal to the first port and the second port.

9. The apparatus of claim 1, further comprising a purge drain that is fluidly connected to the second end of the conduit and is substantially vertically aligned with the centerline of the conduit.

10. The apparatus of claim 1, wherein the flow control reversing valve has a third position, and wherein the flow control reversing valve in the third position prevents liquid from flowing from the first port to the second port and from the second port to the first port.

11. An apparatus for distributing a liquid, comprising:
a pump having an inlet, an outlet, a front side, a rear side, a first side, a second side opposite the first side, a top side, and a bottom side, and a longitudinal centerline extending from the front side to the rear side;

a conduit having a first end, a second end, and a longitudinal centerline extending from the first end of the conduit to the second end of the conduit, the first end of the conduit having an outlet and the second end of the conduit having an inlet, the inlet of the conduit connected to the outlet of the pump;

a strainer housing having a strainer basket contained therein, the strainer housing having a first end, a second end, and a longitudinal centerline extending from the first end of the strainer housing to the second end of the strainer housing, the first end of the strainer housing having an inlet and the second end of the strainer housing having an outlet, the outlet of the straining housing connected to the inlet of the pump; and a flow control reversing valve having a valve body and a valve member, the valve body having a front side, a rear side, a first side, a second side opposite the first side, a top side, and a bottom side, and a longitudinal centerline extending from the front side to the rear side, the first side having a first port connectable to a first containment vessel and the second side having a second port connectable to a second containment vessel, the bottom side having an inlet connected to the outlet of the conduit, and the top side having an outlet connected to the inlet of the strainer housing, the valve member movable between a first position wherein liquid flows from the first port to the second port and a second position wherein liquid flows from the second port to the first port, wherein each of the longitudinal centerlines of the pump, the conduit, the strainer housing, and the flow control reversing valve is substantially vertically aligned with one another.

12. The apparatus of claim 11, wherein the strainer housing is positioned above the flow control reversing valve and the conduit.

13. The apparatus of claim 11, wherein the conduit is positioned below the flow control reversing valve.

14. The apparatus of claim 11, wherein the inlet and the outlet of the flow control reversing valve are vertically aligned with the centerline of the flow control reversing valve.

15. The apparatus of claim 11, wherein the inlet and the outlet of the strainer housing are vertically aligned with the centerline of the strainer housing.

16. The apparatus of claim 15, wherein the inlet and the outlet of the conduit are vertically aligned with the centerline of the conduit.

17. The apparatus of claim 11, wherein the inlet and the outlet of the flow control reversing valve are vertically aligned with the centerline of the flow control reversing valve, wherein the inlet and the outlet of the strainer housing are vertically aligned with the centerline of the strainer housing, and wherein the inlet and the outlet of the conduit are vertically aligned with the centerline of the conduit.

18. The apparatus of claim 11, wherein the inlet and the outlet of the flow control reversing valve are positioned orthogonal to the first port and the second port.

19. The apparatus of claim 11, further comprising a purge drain that is fluidly connected to the second end of the conduit and is substantially vertically aligned with the centerline of the conduit.

20. The apparatus of claim 11, wherein the flow control reversing valve has a third position, and wherein the flow control reversing valve in the third position prevents liquid from flowing from the first port to the second port and from the second port to the first port.

* * * * *